US008450447B2

(12) United States Patent
Harris et al.

(10) Patent No.: US 8,450,447 B2
(45) Date of Patent: May 28, 2013

(54) COPOLYESTERAMIDES WITH DECREASED PERFECTION OF THE AMIDE SEQUENCE

(75) Inventors: William J. Harris, Lake Jackson, TX (US); Peter S. Martin, Houston, TX (US); Jerry E. White, Lake Jackson, TX (US); Rene Broos, Bornem (BE)

(73) Assignee: Dow Global Technologies LLC

( * ) Notice: Subject to any disclaimer, the term of this patent is extended or adjusted under 35 U.S.C. 154(b) by 736 days.

(21) Appl. No.: 12/528,525

(22) PCT Filed: Mar. 13, 2008

(86) PCT No.: PCT/US2008/056754
§ 371 (c)(1),
(2), (4) Date: Aug. 25, 2009

(87) PCT Pub. No.: WO2008/112833
PCT Pub. Date: Sep. 18, 2008

(65) Prior Publication Data
US 2010/0093971 A1 Apr. 15, 2010

Related U.S. Application Data

(60) Provisional application No. 60/918,026, filed on Mar. 14, 2007.

(51) Int. Cl.
*C08G 69/44* (2006.01)
(52) U.S. Cl.
USPC ........... 528/332; 528/272; 528/274; 528/288; 528/310; 528/335; 528/336
(58) Field of Classification Search
USPC ................. 528/272, 274, 288, 310, 332, 335, 528/336
See application file for complete search history.

(56) References Cited

U.S. PATENT DOCUMENTS

| | | | |
|---|---|---|---|
| 4,343,743 | A | 8/1982 | Coquard et al. |
| 5,268,445 | A | 12/1993 | Gaymans et al. |
| 5,510,451 | A | 4/1996 | Gaymans et al. |
| 5,852,155 | A | 12/1998 | Bussink et al. |
| 6,172,167 | B1 | 1/2001 | Stapert et al. |
| 2010/0137478 | A1 | 6/2010 | White et al. |

FOREIGN PATENT DOCUMENTS

| | | |
|---|---|---|
| EP | 315027 | 5/1989 |
| EP | 360311 | 3/1990 |
| EP | 445548 | 9/1991 |
| EP | 445547 | 4/1994 |
| EP | 729994 | 9/1996 |
| JP | 2006045508 | * 2/2006 |
| WO | 91/13930 | 9/1991 |
| WO | 98/00454 | 1/1998 |
| WO | 01/23457 | 4/2001 |
| WO | 03/070806 | 8/2003 |
| WO | 03/070807 | 8/2003 |
| WO | 2007/030791 | 3/2007 |
| WO | 2007/099397 | 9/2007 |

OTHER PUBLICATIONS

Corbin et al., "Chapter 6 Hydrogen-Bonded Supramolecular Polymers: Linear and Network Polymers and Self-Assembling Discotic Polymers", Supramolecular Polymers, 2005, 153-182, 2nd Edition, CRC Press.
Dijkstra et al., "Synthesis of aliphatic poly(ester-amide)s containing uniform bisamide-bisester blocks", Macromolecular Symposia, 2000, pp. 127-137, vol. 152, Wiley-VCH Verlag GmbH.
Goodman et al., "Copolyesteramides—V. Hexamethylene Adipamide/Hexamethylene Adipate Random and Ordered Copolymers: Preparation and General Properties", European Polymer Journal, 1990, pp. 1081-1088, vol. 26, No. 10, Pergamon Press plc.
Koevoets et al., "Molecular Recognition in a Thermoplastic Elastomer", Journal of the American Chemical Society, 2005, 2999-3003, vol. 127, No. 9, American Chemical Society.
Lips et al., "Incorporation of different crystallizable amide blocks in segmented poly(ester amide)s", Polymer, 2005, 7834-7842, vol. 46, Elsevier Ltd.
Lips et al., "Synthesis and characterization of poly(ester amide)s containing crystallizable amide segments", Polymer, 2005, 7823-7833, vol. 46, Elsevier Ltd.
Signori et al., "Segmented Multifunctional Poly(ether ester) Polymers Containing H-Bonding Units. Preparation and Characterization", Macromolecular Chemistry & Physics, 2004, pp. 1299-1308, vol. 205, Wiley-VCH Verlag GmbH & Co.
Signori et al., "Synthesis and Characterization of Segmented Poly(ether ester)s Containing H-Bonding Units", Macromolecular Chemistry & Physics, 2003, pp. 1971-1981, vol. 204, Wiley-VCH Verlag GmbH & Co.
Polyamides, Plastics. Encyclopedia of Polymer Science and Technology. pp. 618-643. vol. 3. John Wiley & Sons, Inc.
Kagiya, Tsutomu. Synthesis of Polyamides by the Polyaddition of Bisimidazoline with Dicarboxylic Acids. Journal of Polymer Science: Part A-1. pp. 1129-1135. vol. 5. 1967.

* cited by examiner

*Primary Examiner* — Gregory Listvoyb

(57) ABSTRACT

Polyesteramides prepared from decreased perfection diamide diester monomers. The polymers exhibit improved physical properties.

18 Claims, 4 Drawing Sheets

COPOLYESTERAMIDES WITH DECREASED PERFECTION OF THE AMIDE SEQUENCE

CROSS-REFERENCE TO RELATED APPLICATIONS

This is a §371 application from PCT International Application Number PCT/US2008/056754, filed Mar. 13, 2008, which claims benefit from U.S. Provisional Application No. 60/918,026, filed Mar. 14, 2007, the contents of both of which are incorporated herein by reference.

FIELD OF THE INVENTION

The invention generally relates to copolyesteramide polymers and to processes for preparing copolyesteramide polymers.

BACKGROUND OF THE INVENTION

Polyesteramides, materials in which amide functionalities are incorporated into polyesters, have attracted strong industrial interest primarily because of their excellent heat resistance properties, their amenability to processing, and their potential for biodegradability. Various methods have been described in the prior art for the preparation of polyesteramides. One such method involves reaction of a diamine with a dicarboxylic acid or ester to form a diester diamide. The diamide diester is isolated and purified, and then further reacted with a diol and a diester to form the polymer.

The known processes for preparing polyesteramides are, in general, complex and uneconomical, especially in view of the several synthetic, isolation, and purification steps required to achieve final polymer. Consequently, a need exists for simpler and more economical processes for preparing polyesteramides. A need also exists for new polyesteramides that exhibit improved physical properties compared to known systems.

BRIEF SUMMARY OF THE INVENTION

In one aspect, the invention provides a copolyesteramide of formula (I):

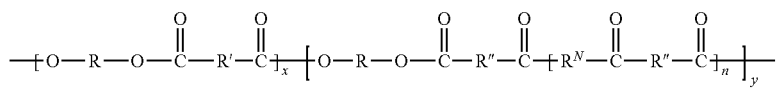

formula (I)

wherein

R at each occurrence is independently an aliphatic group (preferably $C_2$-$C_{12}$ alkylene), a heteroaliphatic group (preferably heteroalkylene of about 2 to about 12 backbone atoms), cycloalkylene (preferably $C_3$-$C_7$ cycloalkylene), -alkylene-cycloalkyl-, -alkylene-cycloalkyl-alkylene-, -heteroalkylene-cycloalkyl-, -heteroalkylene-cycloalkyl-heteroalkylene-, or polyalkylene oxide [such as polytetramethylene ether (i.e. R is —$CH_2CH_2CH_2CH_2$—($OCH_2CH_2CH_2CH_2$)$_m$—), polypropylene oxide (i.e. R is —$CH_2CH(CH_3)$—[$OCH_2CH(CH_3)$]$_m$—), or polyethylene oxide (i.e. R is —$CH_2CH_2$—($OCH_2CH_2$)$_m$—), wherein each m independently is an integer of 1 or higher];

R' and R" at each occurrence are independently a bond or an aliphatic group (preferably of 1 to 10, more preferably 2-6 carbon atoms), cycloalkylene (preferably $C_3$-$C_7$ cycloalkylene), -alkylene-cycloalkyl-, or -alkylene-cycloalkyl-alkylene-;

$R^N$ is —$N(R^2)$—Ra—$N(R^2)$—, where $R^2$ is independently H or $C_1$-$C_6$ alkyl (preferably both H), Ra independently is a heterocycloalkylene group, an aliphatic group (preferably alkylene group of 2 to 12, preferably 2-6 carbon atoms), cycloalkylene (preferably $C_3$-$C_7$ cycloalkylene), -alkylene-cycloalkyl-, or -alkylene-cycloalkyl-alkylene, wherein the heterocycloalkylene group contains two nitrogen atoms connecting the heterocycloalkylene to the adjacent carbonyl groups (e.g., $R^N$ is piperazin-1,4-diyl);

x is an integer of 0 or higher that represents the number of ester units and y is an integer of 2 or higher that represents the number of amide units in the copolymer;

each n independently represents an integer of 1 or greater; and wherein the copolymer of formula (I) comprises two or more said amide units:

where n is 1 in at least half the number of said amide units; and wherein n is greater than 1 in at least one of said amide units, with the copolymer having a weighted average value of n, represented herein by $H_w$, of greater than 1.05 and less than 1.9. Preferably, x is 1 or higher.

In another aspect, the invention provides a process for making a polyesteramide copolymer of formula (I), the process comprising:

(a) providing a monomer product comprising a mixture of two or more monomers of formula (A):

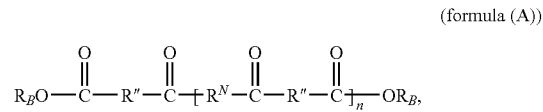

(formula (A))

wherein each n independently represents an integer of 1 or higher and n is 1 in at least half of the monomers and n is greater than 1 in at least one of the monomers, with the monomer product having an $H_w$, of greater than 1.05 and less than 1.9, wherein $H_w$ is a weighted average value of n and $R^N$ and R" are as defined above, $R_B$ is independently at each occurrence H or $C_1$-$C_6$ alkyl;

(b) copolymerizing the monomers of formula (A) with at least one diacid or diester of formula (C):

 (formula (C))

wherein $R_B$ and R' are as defined above, and at least one diol of formula (D):

 (formula (D))

wherein R is as defined above,
to provide the polymer of formula (I).

In a further aspect, the invention provides polymers of formula (I) prepared according to the processes described herein.

DETAILED DESCRIPTION OF THE INVENTION

Figure 1:
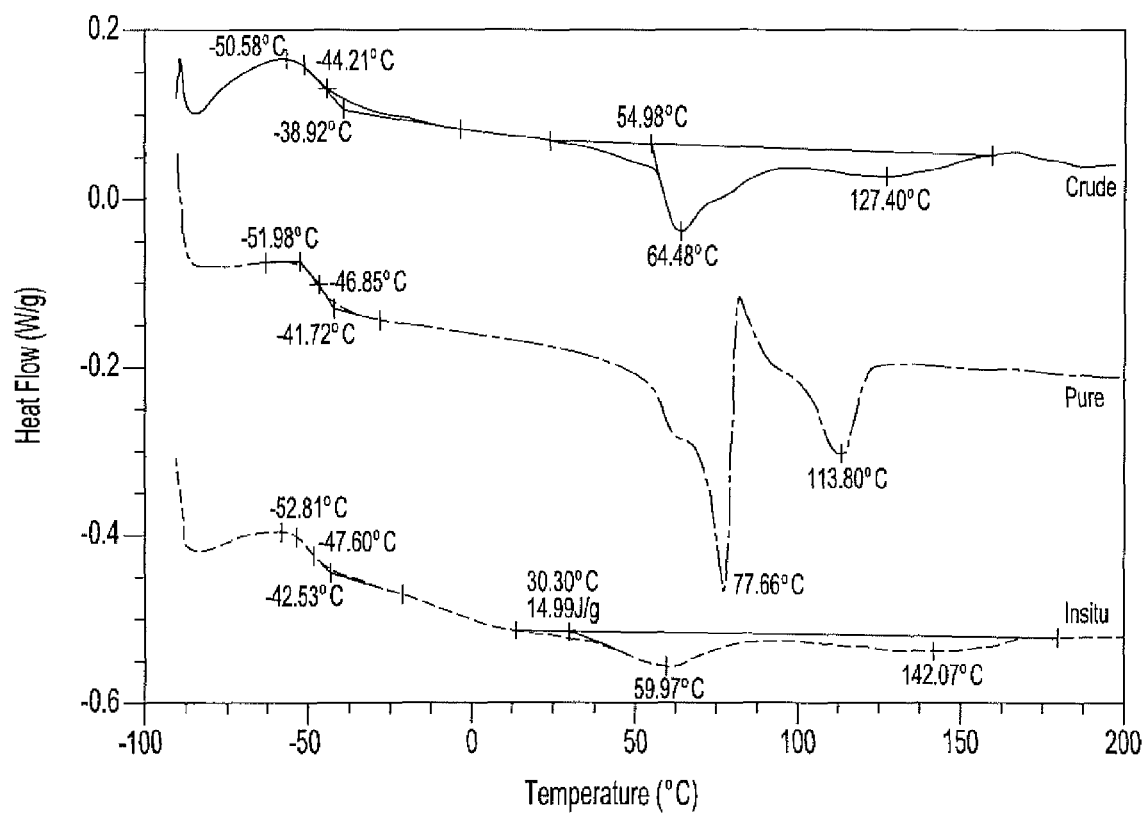
FIG. 1 is a DSC of various polyesteramide polymers prepared using different types of monomer feed.

In one aspect, the invention provides a polyesteramide copolymer of formula (I):

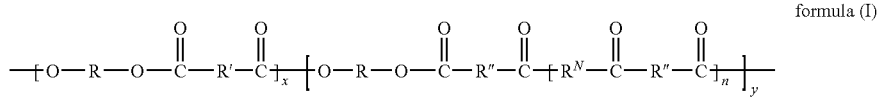

formula (I)

wherein
R, R', R", $R^N$, n, x, and y are as defined above with the copolymer having a weighted average value of n, represented herein by $H_w$, of greater than 1.05 and less than 1.9. In another aspect, the invention provides a copolyesteramide of formula (I) as defined above wherein x is 1 or higher.

While for convenience the repeat units of the copolymers of the invention are as shown, the copolymers are not necessarily block copolymers. Rather, the invention encompasses all possible distributions of the x and y units in the copolymers, including randomly distributed x and y units, alternately distributed x and y units, as well as partially and fully block or segmented copolymers.

Further, although again for convenience only one x unit and only y unit is represented for each copolymer, it should be noted that even though each individual defined group (e.g., each R group) may be the same throughout a specific x or y unit, the invention also encompasses materials where a defined group differs from one x unit to another x unit (or one y unit to another y unit) in the same copolymer. Thus, for example, the invention encompasses a copolymer prepared from two or more different amide monomers such as monomers based on ethylene diamine and diaminohexane, two or more different diesters, two or more different diols, etc. (syntheses are discussed more fully below).

Preferred polymers of formula (I) include polymers wherein R at each occurrence is the same and is an aliphatic group. More preferably, R is $C_2$-$C_6$ alkylene, and even more preferably it is —$(CH_2)_4$—.

Preferred polymers of formula (I) also include polymers wherein R is heteroaliphatic, cycloalkylene (preferably $C_3$-$C_2$ cycloalkylene), -alkylene-cycloalkyl-alkylene-, -heteroalkylene-cycloalkyl-, or -heteroalkylene-cycloalkyl-heteroalkylene-. Preferred -alkylene-cycloalkyl-alkylene- for this embodiment includes dimethylene cyclohexyl. Preferred heteroalkylene groups for this embodiment include oxydialkylenes such as diethylene glycol (—$CH_2CH_2OCH_2CH_2$—).

Preferred polymers of formula (I) further include polymers where R is a polyalkylene oxide, i.e., R together with the oxygens to which it is attached forms a bridging polyol, such as polytetramethylene ether, polypropylene oxide, polyethylene oxide, other polyalkylene oxides, including polyalkylene oxides containing mixed length alkylenes.

Preferred polymers of formula (I) also include polymers wherein R' at each occurrence is the same and is an aliphatic group. More preferably, R' is $C_1$-$C_6$ alkylene, and even more preferably it is —$(CH_2)_4$—.

Preferred polymers of formula (I) also include polymers wherein R" at each occurrence is the same and is an aliphatic group. More preferably, R" is $C_1$-$C_6$ alkylene, and even more preferably it is —$(CH_2)_4$—.

Preferred polymers of formula (I) also include polymers wherein there are two or more occurrences of R' or R" and in at least two of the two or more occurrences, the R' or R" are different.

Preferred polymers of formula (I) also include polymers where $R^N$ is —$N(R^2)$—Ra—$N(R^2)$—. Preferably, both $R^2$ groups are hydrogen. Also preferably, Ra is alkylene, and particularly, ethylene, butylene, or hexylene. Most preferred Ra groups are ethylene and hexylene (—$(CH_2)_6$—).

In the invention, $H_w$ of the formula (I) polymer is greater than 1.05, preferably at least 1.06, more preferably at least 1.07, even more preferably at least 1.08, and further preferably at least 1.09. In a further preferred embodiment, $H_w$ is at least 1.1. In additional embodiments, $H_w$ is at least 1.3, at least 1.5, or at least 1.7. $H_w$ in the invention is less than 1.9.

The copolymer of formula (I) comprises two or more y units where n is 1 in at least one y unit; and wherein n is greater than 1 in a least one y unit. In the invention, such a polymer is referred to as having "decreased perfection" of the amide sequence. The terms "y unit" and "amide unit" are used interchangeably herein. Referring to numbers of the y units (i.e., amide units) relative to each other, preferably the polymer contains predominantly (i.e., greater than 50 mole percent) n=1 y units (i.e., more than half the total number of amide units are n=1 amide units), but also contains additional longer amide sequence y units (i.e., amide units wherein n is 2 or higher) such that less than 50 mole percent of y units (i.e., less than half the total number of amide units) are those where n is 2 or higher.

In further embodiments, it is also preferred that the y units in the polymer of formula (I) contain at least about 60 mole percent where n=1 in the y units, more preferably at least about 70 mole percent, even more preferably at least about 85 mole percent. It is further preferred that the polymer contain no more than 95 mole percent n=1 in the y units (with the remainder being higher sequence amides, such n=2, n=3, and/or n=4, etc.).

The inventors have discovered that the decreased perfection polymers of formula (I) surprisingly provide improved physical properties as demonstrated by the Examples below, including improved thermal stability when compared to material which is essentially completely n=1 polymer. As shown by the Examples, such improved properties also include increased melting range (related to the aforementioned thermal stability), melting onset, melting completion, crystallization temperature, and crystallization onset. Examples of other useful properties of the decreased perfection polymers of formula (I) are tensile strength, modulus, and percent elongation to break. Another particularly useful property of the decreased perfection polymers of formula (I) is earlier (e.g., immediate after initiation of plastic deformation) onset of strain hardening under tensile strain (see FIG. 3).

Such properties show that the decreased perfection polymers of formula (I) are useful in foams, films, coatings, hot melt adhesives, fibers, fabrics, and extruded and molded articles, which comprise additional aspects of the present invention.

In another aspect, the invention provides a process for preparing polymers of formula (I). The process comprises:
(a) providing a monomer product comprising a mixture of two or more monomers of formula (A):

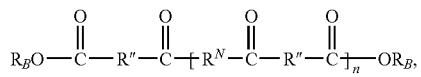
(formula (A))

wherein $R_B$ is independently at each occurrence H or $C_1$-$C_6$ alkyl; each n independently represents an integer of 1 or higher and n is 1 in at least half of the monomers and n is greater than 1 in at least one of the monomers, with the monomer product having an $H_w$ of greater than 1.05 and less than 1.9, wherein $H_w$ is a weighted average value of n, and $R^N$ and R" are as defined above for formula (I);
(b) copolymerizing the monomers of formula (A) with at least one diacid or diester of formula (C):

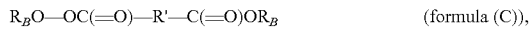
(formula (C)), wherein R' is as defined above for formula (I);
and at least one diol of formula (D):

(formula (D)), wherein R is as defined above for formula (I), to provide the polymer of formula (I).

The monomer product comprising a mixture of two or more monomers of formula (A) (also referred to herein as decreased perfection monomers) is an unpurified mixture of monomers containing at least half of, preferably predominantly, monomer where n is 1, but also other monomer(s) where n is greater than one. Monomers where n is greater than one are referred to herein as high or higher sequence monomers. In addition, to providing polymers with advantageous properties, as discussed above and illustrated by the Examples, the use of unpurified monomers also reduces the steps required to prepare the polymers, thereby reducing costs as well as the environmental impact of the polymerization process, in part because of the decreased need for raw materials that would normally be required to purify the monomer.

Various analytical methods can be used to assess the level of decreased perfection in the polymer of formula (I) with a convenient method being nuclear magnetic resonance (NMR) spectroscopy (as illustrated below). Using NMR spectroscopy, resonances from atoms in the amide unit of the polymer (i.e., the unit quantified by n) can be integrated against resonances from atoms outside the amide unit but inside the y unit (i.e., the unit of the polymer quantified by "y") to determine a weighted number of amide units in the y unit, referred to herein as $H_w$. $H_w = \Sigma n_i m_i / \Sigma m_i$ where $n_i$ is the integer number for each n and $m_i$ is the moles or mole fraction for each n.

Thus, for instance, if the polymer is completely n=1 polymer, then $H_w$ would be 1. When $H_w$ is greater than 1, the polymer contains y units with higher amide sequences (e.g., n=2 and/or n=3, etc.). By way of further example, if a material is 95 mol % n=1 and 5 mol % n=2, then $H_w$ is 1.05 (i.e., (0.95×1)+(0.05×2)). If a material is 95 mol % n=1, 4% n=2, and 1% n=3, $H_w$ for the polymer is 1.06. If a material is 6 moles n=1, 3 moles n=2, and 1 mole n=3, $H_w$=1.5.

Using NMR to determine $H_w$ for a polymer is within the skill of a person of ordinary skill in the art as long as the key atom resonances are readily distinguishable in an NMR spectrum. With $H_w$ being essentially the same in an amide monomer and the polymer prepared from that amide monomer under normal polymerization conditions, it is usually simpler to measure $H_w$ from the NMR spectrum of the amide monomer used to form the polymer of formula (I) since there are no atom resonance contributions from the ester portion, x, of the polymer of formula (I) to complicate the spectra. Determining $H_w$ based on the monomer is also preferable as NMR peaks from the monomer tend to be narrower, and therefore more readily distinguishable than in the polymer.

The purity and $H_w$ value for a monomer product of formula (A) can be readily assessed using proton NMR, in the same manner as described above for polymers. Particularly useful NMR resonances for the monomer are the signals from the protons of the terminal acid or alkyl ester (the $R_B$ group protons) and the signals from the protons most adjacent to the amide nitrogen (for example, if $R^N$ in formula (A) is —N(H)—(CH$_2$)$_4$—N(H)—, then the resonance from the methylenes directly adjacent to the amide nitrogen are preferably used). As will be readily understood, one skilled in the art can use other resonances in NMR, as well as other types of NMR such as carbon NMR, to assess monomer purity, or can use other techniques entirely. The technique used to measure purity is not critical to the invention.

By way of illustration, for a monomer of the following formula (designated A4A in the examples below):

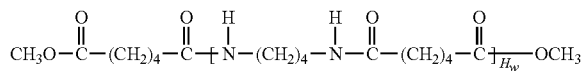

$H_w$ can be determined using $^1$H NMR by integrating a methylene adjacent to an amide nitrogen (chemical shift of about 3.3-3.4 ppm) and the signal from a terminal methoxy (chemical shift of about 3.6-3.7 ppm). As seen in the Examples below, the signals integrate to 0.775 for the methylene protons and 1 for the methoxy protons (for crude A4A monomer). So for this specific A4A molecule, OCH3/C H2N=6/(4$H_w$)=1/0.775, so solving for $H_w$, $H_w$ is 1.$\overline{1625}$. With changes in the type of ester (or even carboxylic acid) or the type of amine used to make amide or selection of other atom resonances $H_w$ can be readily determined, but the above formula might need adjustments to calculate $H_w$, which one of ordinary skill in the art can do.

In the invention, $H_w$ of the formula (A) monomer product is greater than 1.05, preferably at least 1.06, more preferably at least 1.07, and even more preferably at least 1.08. In a further preferred embodiment, $H_w$ is at least 1.1. In additional embodiments, $H_w$ is at least 1.2, at least 1.3, at least 1.5, or at least 1.7. $H_w$ in the invention is less than 1.9. Monomers having $H_w$ of greater than 1.05 are referred to herein as "crude" monomers. Monomers having $H_w$ of 1.05 or less are referred to herein as "pure" monomers.

In further embodiments, it is also preferred that the monomer product of formula (A) contain at least about 60 mole percent n=1 monomer, more preferably at least about 70 mole percent, even more preferably at least about 85 mole percent. It is further preferred that the monomer product contain no more than 95 mole % n=1 monomer (with the remainder being higher sequence amides, such as n=2, n=3, and/or n=4, etc.).

Monomers of formula (A) can be readily prepared by those skilled in the art using well known methods. The purity of the monomer product is influenced by a variety of factors, including the reaction conditions, the conditions used for the isolation and/or purification of the monomer, as well as the solubility characteristics of the monomer. In addition, the ratio of diester to diamine can impact the product distribution in the monomer, the amount of longer amide sequences (n=2, 3, 4, etc in formula (A)). For instance, at infinite dilution of diamine by diester, reaction should lead to essentially pure n=1 monomer, but for a ratio such as 10 moles of diester to 1 mole of diamine, the reaction results in predominantly n=1 monomer but with increasing amounts of longer amide sequence monomers such as n=2 monomer, and/or n=3, etc.

In a typical procedure for preparing the monomer of formula (A), a diamine, such as that of formula (B) below, is reacted with an excess (e.g., 3 to 15 mole excess) of a dicarboxylic acid or ester of formula (C) under an inert atmosphere.

H—$R^N$—H  formula (B)

$R_B$O—OC(=O)—R''—C(=O)O$R_B$  formula (C)

The reaction is carried out neat or in the presence of a catalyst such as titanium (IV) butoxide. The selection of catalyst and the amount of catalyst preparing amides from amines and carboxylic acids or esters, in general, is known and selected by one skilled in the art. The temperature of the reaction mixture is preferably slowly raised up to about 100° C., and the reaction continued until a desired quantity of product is formed, for instance about 12 hours. Depending on a particular diamine, temperature of the reaction mixture may be slowly raised from room temperature (e.g., 20° C.) to about 200° C., the reaction mixture may be maintained at ambient pressure (e.g., about 1 atmosphere) or, for volatile diamines, greater than ambient pressure, or a combination thereof. The product may be isolated, for instance by filtration when a solid or evaporation of starting materials at a readily ascertainable combination of temperature and pressure when a liquid, or may be used in the polymerization reaction without isolation, as discussed below.

Various processes may be used for preparing polyesteramides of formula (I). In one preferred process, the formula (A) monomer product is synthesized and isolated as described above (but not purified), and then copolymerized with a diacid or diester of formula (C) and a diol of formula (D):

HO—R—OH  formula (D)

Typically, the polymerization is carried out in the presence of one of the many known polyester catalysts, such as titanium (IV) butoxide and at elevated temperature (for example, about 165 to 250° C.) with reduced pressure applied as needed to facilitate molecular weight increase. Various mole ratios of reactants can be used. For example, a mole ratio of formula (A) monomer to diacid or diester of about 1:0.1 to about 1:50, preferably between 1:1 and 1:20, and a mole ratio of formula (A) monomer to diol of about 1:1.1 to about 1:100, preferably about 1:2 to about 1:50, are preferred. For another aspect wherein the invention provides a copolyesteramide of formula (I) as defined above, preferred is a mole ratio of formula (A) monomer to diacid or diester of about 1:0.1 to 1:0. When x is 0, the mole ratio of formula (A) monomer to diacid or diester of 1:0, i.e., diacid or diester is absent. The reaction is continued until sufficient quantities of polymer of desired molecular weight are formed, for instance about 0.1-24 hours. The pressure in the reaction may be reduced to facilitate removal of volatile components. The temperature of the reaction may then be lowered to room temperature and the product polymer removed from the reaction vessel or polymer can be removed from the reactor while molten with temperature increased as needed.

In another preferred process for synthesizing polymer of formula (I), this process referred to herein as the "in-situ" process, the formula (A) monomer is prepared as described above, but is not isolated from its reaction mixture. Rather, the reaction mixture containing the formula (A) monomer is copolymerized with formula (C) and formula (D) monomers. Similar reaction conditions to those described earlier may be used.

In a further preferred process for synthesizing polymer of formula (I), referred to herein as the "one-pot" or "direct" method, all the materials used for synthesizing monomer and polymer (the diamine of formula (B), the diacid or diester of formula (C) and the diol of formula (D)) are reacted together in a single vessel. Again the reaction is preferably conducted in the presence of catalyst, such as titanium (IV) butoxide. Additional catalyst(s) may be added at almost any point in the "direct" method.

The formula (I) copolyesteramides of this invention are not intended to be limited by molecular weight. It is preferred, however, that the copolyesteramides be at least about 2000 grams per mole (g/mol) in number average molecular weight ($M_n$) and less than about 100,000 g/mol and it is more preferred that the molecular weight $M_n$ be between about 4000 g/mol and about 50,000 g/mol.

In the preparation of the materials of the invention it is possible to control the copolyesteramides molecular weight $M_n$ by off-stoichiometry of the monomers utilized in preparing the product or the utilization of a terminating agent such as a monoacid, monoester, monol, monoamine, and other single functional reactive species added at any point during the polymerization. It is also possible to prepare a branched material by adding a reactive trifunctional species, or higher polyfunctional species, at some point in the polymerization process with examples of such trifunctional species including, but not limited to, triacids, trimesters, triols, triamines, and other reactive polyfunctional species.

As demonstrated by the Examples below, the polymer of formula (I) prepared according to the invention exhibits superior physical properties, when compared to polymer prepared by known methods As used herein, the term "aliphatic" refers to hydrocarbons which are saturated or unsaturated (alkanes, alkenes, alkynes) and which may be straight-chain or branched chain. The term encompasses bridging versions thereof (e.g., alkylene, alkenylene, and alkynylene). Aliphatic groups can be optionally substituted with one or more, preferably 6 or less, various substituents or functional groups, including among others halides (preferably fluoro), alkoxy groups (preferably $C_1$ to $C_{12}$ alkoxy), hydroxy groups, thiol (i.e., —SH) groups, carboxylic ester groups (preferably, COO—($C_1$ to $C_{12}$ alkyl)), ketone (e.g., $C_1$ to $C_{12}$ acyl) groups, carboxylic acid groups (i.e., —COOH), amines (preferably $NR^DR^E$), and carboxamides (preferably —C(O)$NR^DR^E$), wherein each $R^D$ and $R^E$ independently is H or $C_1$ to $C_{12}$ alkyl. Preferred aliphatic groups include $C_2$-$C_{12}$ alkylene, more preferably $C_2$-$C_8$ alkylene, such as —$CH_2CH_2$—, —$CH_2C(CH_3)_2CH_2$—, and the like. Particularly preferred aliphatic groups are ethylene, butylene (especially 1,4-butylene), and hexylene (especially 1,6-hexylene).

A "heteroaliphatic" group is an aliphatic group that contains one or more non-carbon atoms in the hydrocarbon chain of the aliphatic group (e.g., one or more non-neighboring $CH_2$ groups are replaced with O, S or NH). Preferred heteroaliphatic groups include $C_2$-$C_{12}$ heteroalkylenes, more preferably $C_2$-$C_8$ heteroalkylenes, and particularly where the one or more non-carbon atoms are oxygen.

A "cycloalkyl" group refers to a saturated carbocyclic radical having three to twelve carbon atoms, preferably three to seven. The cycloalkyl can be monocyclic, or a polycyclic fused system. Examples of such radicals include cyclopropyl, cyclobutyl, cyclopentyl, cyclohexyl and cycloheptyl. The cycloalkyl groups herein are optionally substituted in one or more substitutable positions with various groups. For example, such cycloalkyl groups may be optionally substituted with, among others, one or more, preferably 6 or less, halides, alkoxy groups, hydroxy groups, thiol groups, carboxylic ester groups, ketone groups, carboxylic acid groups, amines, and carboxamides as described above for substituents of aliphatic groups. A "cycloalkylene" is a diradical but otherwise is as defined for cycloalkyl.

"-Alkylene-cycloalkyl-," "-alkylene-cycloalkyl-alkylene-," "-heteroalkylene-cycloalkyl-," "-heteroalkylene-cycloalkyl-heteroalkylene-," refer to various combinations of alkyl, heteroalkyl, and cycloalkyl, and include groups such as oxydialkylenes (e.g., diethylene glycol), groups derived from branched diols such as neopentyl glycol or derived from cycloaliphatic diols such as Dow's UNOXOL® (Union Carbide Chemicals & Plastics Technology Corporation of The Dow Chemical Company) which is an isomer mixture of 1,3- and 1,4-cyclohexanedimethanol, and other non-limiting groups, such -methylcyclohexyl-, -methyl-cyclohexyl-methyl-, and the like.

By "heterocycloalkyl" or "heterocycle" is meant one or more carbocyclic ring systems of 4-, 5-, 6-, or 7-membered rings, which includes fused ring systems of 9-11 atoms, containing at least one and up to four heteroatoms (preferably non-adjacent) selected from nitrogen, oxygen, or sulfur. Preferred heterocycles contain two nitrogen atoms in the ring, such as piperazinyl. The heterocycloalkyl groups herein are optionally substituted in one or more substitutable positions with various groups. For example, such heterocycloalkyl groups may be optionally substituted with, among others, one or more, preferably 6 or less, halides, alkoxy groups, hydroxy groups, thiol groups, carboxylic ester groups, ketone groups, carboxylic acid groups, amines, and carboxamides as described above for substituents of aliphatic groups. A "heterocycloalkylene" is a diradical group but otherwise is as defined for heterocycloalkyl.

By "polyalkylene oxide" (e.g., in the definition of variable group "R") is meant a diradical at two different carbon atoms of an -alkylene-(O-alkylene)$_m$-segment, wherein each m independently is an integer of 1 or higher, including polyalkylene oxides containing mixed length alkylenes. Examples of polyalkylene oxides are polytetramethylene ethers (i.e. R is —$CH_2CH_2CH_2CH_2$—($OCH_2CH_2CH_2CH_2$)$_m$—), polypropylene oxides (i.e. R is —$CH_2CH(CH_3)$—[$OCH_2CH(CH_3)$]$_m$—), and polyethylene oxides (i.e. R is —$CH_2CH_2$—($OCH_2CH_2$)$_m$—).

Unless stated otherwise, all variables (e.g., x, y, n, R, and the like) are independently selected. Variables x and y may be selected such that a number average molecular weight $M_n$ of from about 2000 g/mol to less than about 100,00 g/mol, or a preferred $M_n$ therein, of a compound of formula (I) is obtained.

The following examples are illustrative of the invention but are not intended to limit its scope.

EXAMPLES

General

Proton NMRs are performed on a Bruker 250 MHz spectrometer on typical 1-10 wt % solutions typically in d4-acetic acid. Proton NMR is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and copolyesteramides, d4-acetic acid is a convenient solvent. For ester amide monomers of the type called A2A, A4A, and A6A that are methyl esters typical peak assignments are about 3.6-3.7 ppm for $C(=O)$—$OCH_3$; about 3.2-3.3 ppm for N—$CH_2$—; about 2.2-2.4 ppm for $C(=O)$—$CH_2$—; and about 1.2-1.7 ppm for C—$CH_2$—C. For copolyesteramides that are based on A2A, A4A, and A6A with 1,4-butanediol, typical peak assignments are about 4.1-4.2 ppm for $C(=O)$—$OCH_2$—; about 3.2-3.4 ppm for N—$CH_2$—; about 2.2-2.5 ppm for $C(=O)$—$CH_2$—; about 1.2-1.8 ppm for C—$CH_2$—C, and about 3.6-3.75 —$CH_2OH$ end groups.

Differential scanning calorimetry (DSC) is done with a TA Instrument 2920 or Q100 typically with heating rates and cooling rates of 10° C./min. By DSC, the glass transition temperature, Tg, is taken as the temperature in ° C. at the half-height of the glass transition on the second heating of the sample. (e.g. reheat or rescan). By DSC, the melting point temperature, Tm, is the temperature in ° C. at the maxima(s) (e.g. peak(s)) of the endothermic melting transition(s) on the second heating of the sample (e.g. reheat or rescan). By DSC, the crystallization temperature, Tcr, is the temperature in ° C. at the maxima(s) (e.g. peak(s)) of the exothermic crystallization transition(s) upon cooling from the melt. By DSC, the heat of fusion, ΔHf, is the integrated peak area, expressed in Joules per gram (J/g), of the melting peak(s) on the second heating of the sample (e.g. reheat or rescan). By DSC, the heat of crystallization, ΔHcr, is the integrated peak area, expressed in J/g, of the crystallization peak(s) upon cooling from the melt. Inherent viscosities are measured on about 0.5 grams per deciliter (g/dL) solutions at 30° C. in an appropriate solvent such as chloroform/methanol(1/1), phenol/1,1,2,2-tetrachlorethane(3/2), or m-cresol. Tensile testing is performed according to ASTM 1708 using microtensile specimen geometry on an Instron 5581. Dynamic mechanical spectroscopy (DMS) is performed in tensile mode on a TA Instruments RSI solid state rheometer at a typical frequency of 1 Hz and over a typical temperature range starting from −130° C. until no more than about 230° C.

To determine the weight % water uptake after 24 hours exposure ("24 Hr H2O Wt %" in Table 2), molded discs that are approximately 10 mm in diameter and approximately 0.4 mm thick are dried for 48 hours in a 50° C. vacuum oven. The discs are immediately weighed (weight at $t_{0\ hrs}$) and then immersed in approximately 2 milliliters (mL) of deionized water at room temperature. After 24 hours of immersion, discs are removed from water and patted dry with paper towels and immediately weighed (weight at $t_{24\ hrs}$). 24 Hr H2O Wt %=[(weight at $t_{24\ hrs}$−weight at $t_{0\ hrs}$)/weight at $t_{0\ hrs}$] 100%.

Example 1

Preparation of Diamide Diester Monomer ("A2A")

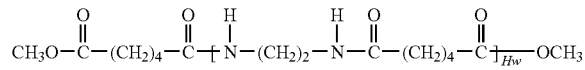

In a nitrogen atmosphere, titanium (IV) butoxide (0.92 g, 2.7 mmol), ethylene diamine (15.75 g, 0.262 mol), and dimethyl adipate (453.7 g, 2.604 mol) are loaded into a 3-neck, 1 L round bottom flask that is stoppered and transferred to hood. Flask is placed under positive nitrogen via inlet adaptor attached to a Firestone valve. Stir-shaft with blade is inserted into flask along with stir bearing with overhead stir motor. Stoppered condenser is inserted into flask. A thermocouple inserted thru septa is also inserted into the flask. Flask is warmed with a hemisphere heating mantle that is attached to proportional temperature controller. Basic reaction profile is 2.0 hours to/at 50° C.; 2.0 hours to/at 60° C.; 2.0 hours to/at 80° C.; overnight at 100° C. Flask is slowly cooled with stirring to about 50° C., stirring stopped and cooled to room temperature. Approximately 200 mL of cyclohexane is add to the reaction flask with agitation for a filterable slurry with solid collected on a medium porosity glass filtration funnel to facilitate removal of unreacted dimethyl adipate. Collected solids are washed twice with about 50 mL of cyclohexane. Product is dried overnight in an about 50° C. vacuum oven. Dried product is broken up and re-slurried in fresh cyclohexane (about 300 mL), recollected by filtration, rinsed twice with about 50 mL cyclohexane, and dried to constant weight in a 50° C. vacuum oven under full pump vacuum. Yield=59.8 grams (66%). Proton NMR in d4-acetic acid generates an Hw of 1.13. A product such as this is designated as crude monomer.

Purification of "A2A".

Crude A2A monomer (35.0 grams) is heated to a boil with stirring in the presence of chloroform (about 150 mL) and methanol (about 285 mL) with the hot mixture filtered to remove insoluble materials. The solvents from the filtrate are removed on a rotary evaporator under reduced pressure with isolated monomer dried to constant weight in a 50° C. vacuum oven for a recovery of 34 grams product that is soluble in a mixture of chloroform/methanol. This soluble product is recrystallized from about 390 mL of methanol with a dried recovered yield of 16.8 grams. Proton NMR in d4-acetic acid generates a $H_w$, of 1.033. This monomer is typically designated as purified (P).

Example 2

Preparation of Diamide Diester Monomer ("A4A")

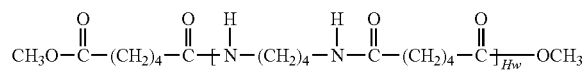

In a nitrogen atmosphere, 1,4-diaminobutane (23.1 g, 0.262 mol), and dimethyl adipate (453.7 g, 2.604 mol) are loaded into a 3-neck, 1 L round bottom flask that is stoppered and transferred to hood. Flask is placed under gentle nitrogen purge via inlet adaptor and exits adaptor attached to bubbler. Stir-shaft with blade is inserted into flask along with stir bearing with overhead stir motor. Dean-Stark trap and condenser are inserted into flask. A thermocouple inserted thru septa is also inserted into the flask. Flask is warmed with a hemisphere heating mantle that is attached to proportional temperature controller. Basic reaction profile is warm to 50° C. and inject titanium (IV) butoxide (0.93 mL, 2.7 mmol); about 30 minutes to/at 60° C.; about 20 minutes to/at 75° C.; about 45 minutes to/at 100° C.; about 90 minutes to/at 125° C.; and about 3.5 hours to/at 150° C. Flask is cooled with stirring to about 75° C. and approximately 100 mL of tetrahydrofuran is added to the reaction flask with agitation for a filterable slurry upon cooling with solid collected on a Buchner funnel to facilitate removal of unreacted dimethyl adipate. Collected solids are washed four times with about 25-50 mL of tetrahydrofuran. Product is dried overnight in an about 50° C. vacuum oven. Dried product is broken up and re-slurried in fresh tetrahydrofuran (about 300 mL), recollected by filtration, rinsed twice with about 50 mL tetrahydrofuran, and dried to constant weight in a 95° C. vacuum oven under full pump vacuum. Yield=74.4 grams. Proton NMR in d4-acetic acid generates an Hw of 1.1625. A product such as this is designated as crude monomer.

Purification of "A4A".

Crude A4A monomer (75 grams) is heated to a boil with stirring in the presence of chloroform (about 525 mL) with the hot mixture filtered to remove insoluble materials. The solvents from the filtrate are removed on a rotary evaporator under reduced pressure with isolated monomer dried to constant weight in a 60° C. vacuum oven for a recovery of 52 grams product that is soluble in chloroform. Proton NMR in d4-acetic acid generates a $H_w$ of 1.026. This monomer is typically designated as purified (P).

Example 3

Preparation of Diamide Diester Monomer ("A6A")

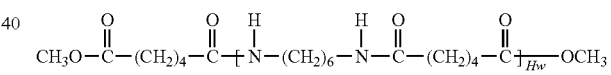

In a nitrogen atmosphere, 1,6-diaminohexane (30.45 g, 0.262 mol), and dimethyl adipate (453.7 g, 2.604 mol) are loaded into a 3-neck, 1 L round bottom flask that is stoppered and transferred to hood. Flask is placed under gentle nitrogen purge via inlet adaptor and exits adaptor attached to bubbler. Stir-shaft with blade is inserted into flask along with stir bearing with overhead stir motor. Dean-Stark trap and condenser are inserted into flask. A thermocouple inserted thru septa is also inserted into the flask. Flask is warmed with a hemisphere heating mantle that is attached to proportional temperature controller. Basic reaction profile is warm to 50° C. and inject titanium (IV) butoxide (0.93 mL, 2.7 mmol); about 45 minutes to/at 60° C.; about 20 minutes to/at 75° C.; about 45 minutes to/at 100° C.; about 120 minutes to/at 125° C.; and about 3.5 hours to/at 150° C. Flask is cooled with stirring to about 75° C. and approximately 100 mL of tetrahydrofuran is added to the reaction flask with agitation for a filterable slurry upon cooling with solid collected on a Buchner funnel to facilitate removal of unreacted dimethyl adipate. Collected solids are washed several times with about 50-100 mL of tetrahydrofuran. Product is dried to constant weight in an about 50° C. vacuum oven. Yield=81.2 grams. Proton NMR in d4-acetic acid generates an Hw of 1.137. A product such as this is designated as crude monomer.

Purification of "A6A".

Crude A6A monomer (38 grams) is heated to a boil with stirring in the presence of chloroform (about 370 mL) with the hot mixture filtered to remove insoluble materials. The solvents from the filtrate are removed on a rotary evaporator under reduced pressure with isolated monomer dried to constant weight in a 50° C. vacuum oven for a recovery of 27 grams product that is soluble in chloroform. Proton NMR in d4-acetic acid generates a $H_w$, of 1.026. This monomer is typically designated as purified (P).

Example 4

Monomer Purity

As described above, the purity of monomers of formula (A) can be determined by 1H NMR spectroscopy. Table 1 below provides comparisons between pure monomers (Hw no more than 1.05) and non-pure monomers according to the invention. Hw are determined as described above.

TABLE 1

Purity Index and $H_w$ of various exemplary monomers

| | $^1$H NMR integration C(O)—OCH$_3$/CH$_2$N | $H_w$ |
|---|---|---|
| Purified A4A | | |
| Sample 1 | 1/0.684 | 1.026 |
| Sample 2 | 1/0.678 | 1.017 |
| Purified A2A | | |
| Sample 1 | 1/0.689 | 1.0335 |
| Sample 2 | 1/0.700 | 1.05 |
| Purified A6A | | |
| Sample 1 | 1/0.684 | 1.026 |
| Crude A4A | | |
| Sample 1 | 1/0.775 | 1.1625 |
| Sample 2 | 1/0.776 | 1.164 |
| Crude A2A | | |
| Sample 1 | 1/0.752 | 1.128 |
| Sample 2 | 1/0.743 | 1.145 |
| Sample 3 | 1/0.759 | 1.1385 |
| Crude A6A | | |
| Sample 1 | 1/0.758 | 1.137 |

Example 5

(CONTROL): Polymerization Using Purified Diester Diamide A4A Monomer

Into a 250 mL round bottom flask is loaded titanium (IV) butoxide (0.123 g, 0.361 mmol), purified dimethyl-7,12-diaza-6,13-dioxo-1,18-octadecanedioate (A4A, 22.36 g, 60.05 mmol), dimethyl adipate (31.38 g, 0.1801 mol) and 1,4-butanediol (43.29 g, 0.480 mol). Into the flask is inserted a stir-shaft and blade, bearing, along with a Vigoreaux column/distillation head. Apparatus is degassed with three vacuum/N$_2$ cycles before being left under N$_2$. Column is heat traced and flask is immersed into bath at 160° C. Set point of bath is increased to 175° C. with a total of 2 hours to/at 175° C. under positive N$_2$. Over a period of about 2.5 hours, pressure is lowered stepwise and held at 10 Torr. Apparatus is placed under full vacuum of about 0.4 Torr for 2 hours at bath temperature of 175° C. Apparatus is kept under full vacuum of about 0.4 Torr for a total of about 3 hours while the bath temperature is increased and held at 190° C. The product inherent viscosity=0.372 dL/g (0.5 g/dL, 30.0° C., chloroform/methanol (1/1, w/w)). DSC, Tensile, and Dynamic Mechanical characterizations are found in FIGS. 1-4.

FIG. 1 graphically depicts 2$^{nd}$ heat DSC of polybutylene adipate with 25 mol % of A4A of different types in monomer feed.

Figure 2:
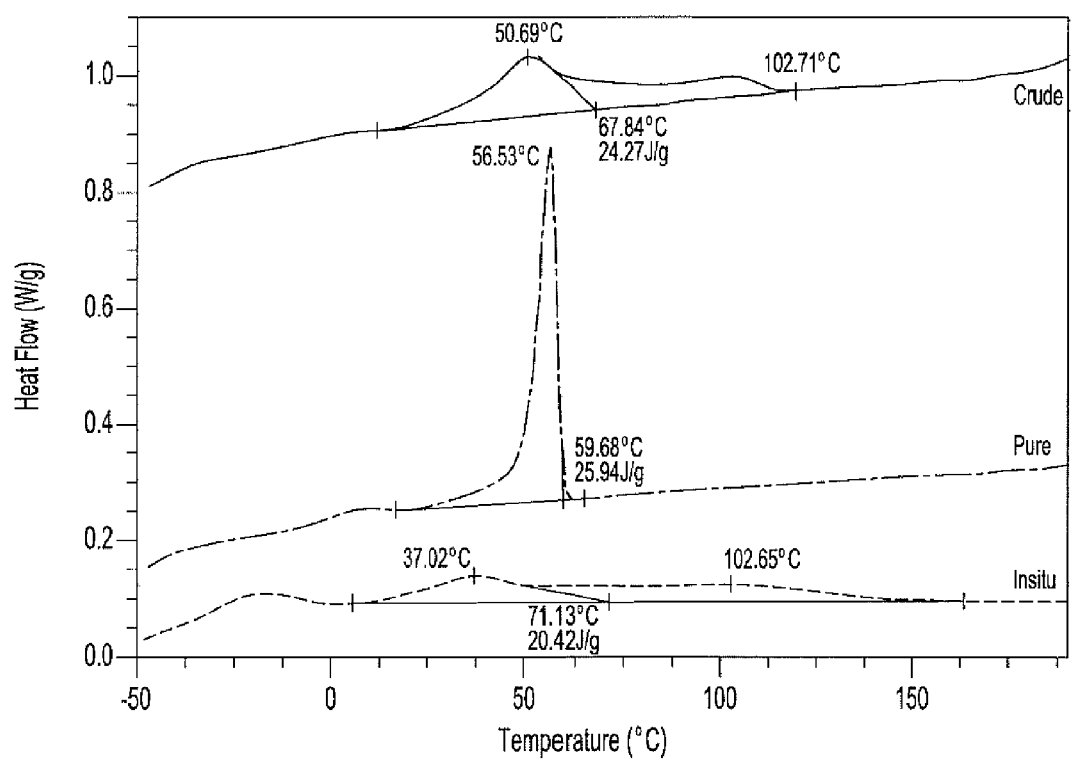
FIG. 2 is a cool from melt DSC various polyesteramide polymers prepared using different types of monomer feed.

FIG. 2 graphically depicts cool from melt DSC of polybutylene adipate with 25 mol % of A4A of different types in monomer feed.

Figure 3:
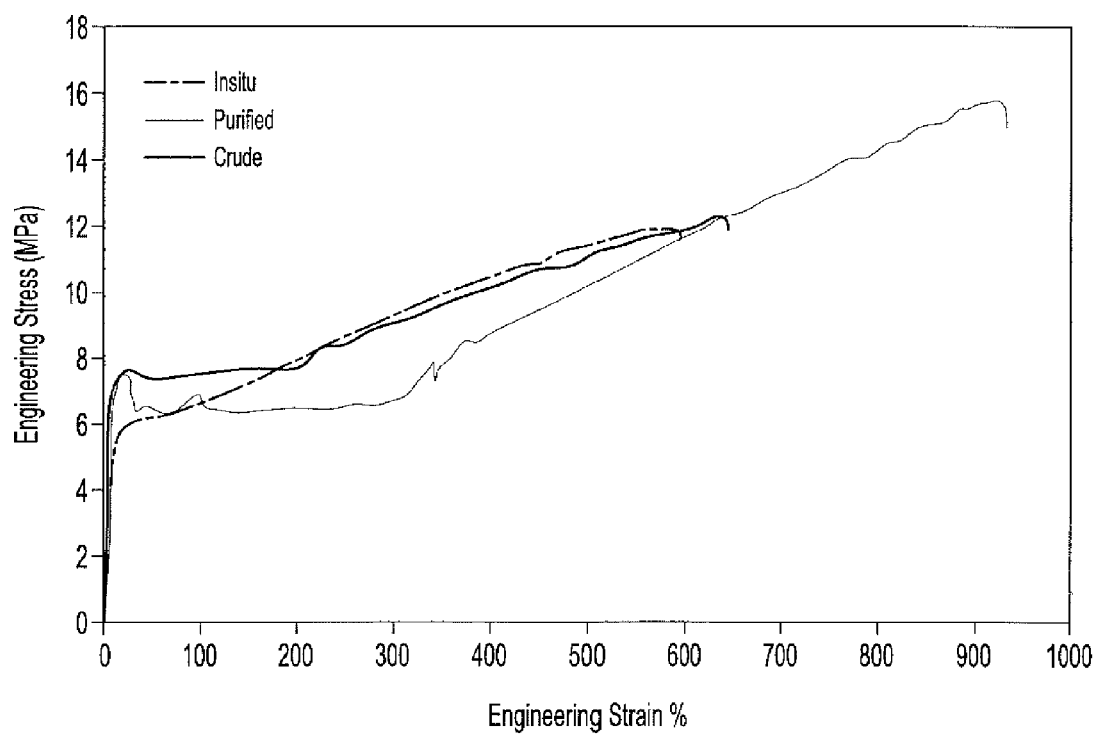
FIG. 3 shows tensile properties of various polyesteramide polymers prepared using different types of monomer feed.

FIG. 3 graphically depicts tensile properties of polybutylene adipate with 25 mol % A4A of different types in monomer feed.

Figure 4:
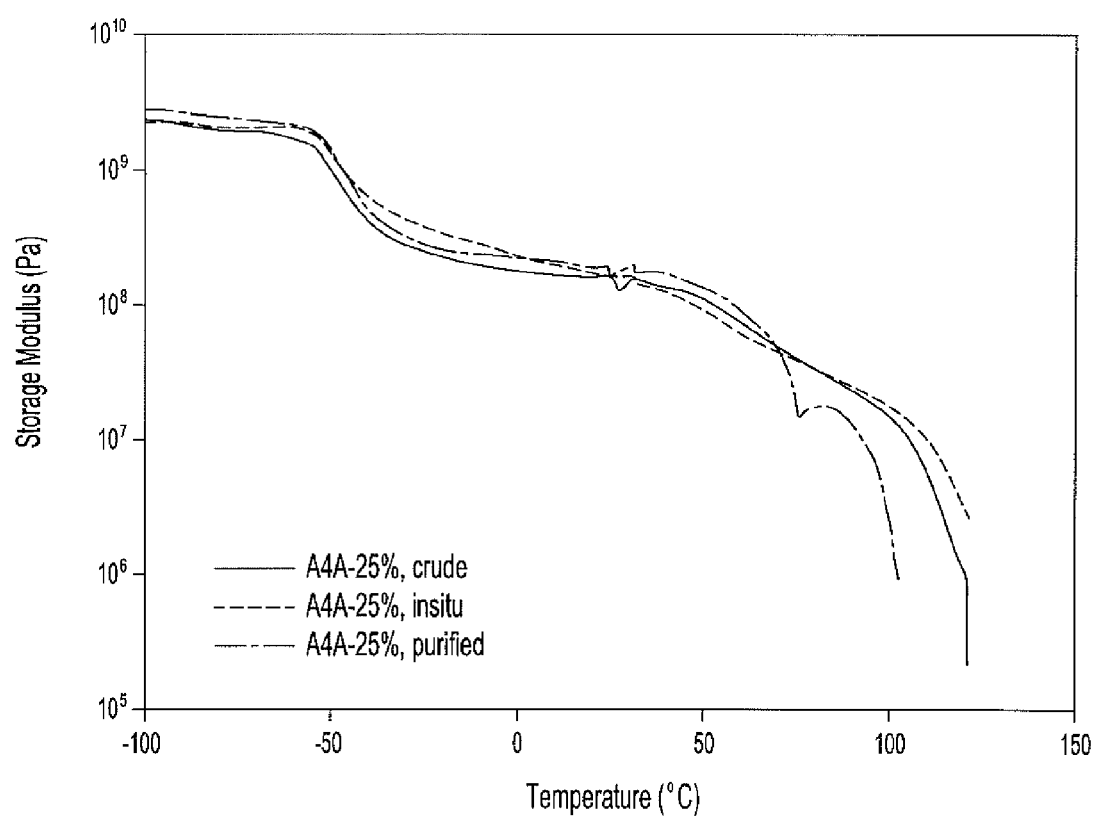
FIG. 4 shows dynamic mechanical properties of various polyesteramide polymers prepared using different types of monomer feed.

FIG. 4 graphically depicts dynamic mechanical properties of polybutylene adipate with 25 mol % A4A of different types in monomer feed.

Example 6

Polymerization Using Crude Diester Diamide A4A Monomer

Into a 250 mL round bottom flask is loaded titanium (IV) butoxide (0.123 g, 0.361 mmol), crude dimethyl 7,12-diaza-6,13-dioxo-1,18-octadecanedioate (A4A, 22.36 g, 60.05 mmol), dimethyl adipate (31.38 g, 0.1801 mol) and 1,4-butanediol (43.29 g. 0.480 mol). Into the flask is inserted a stir-shaft and blade, bearing, along with a Vigoreaux column/distillation head. Apparatus is degassed with three vacuum/N$_2$ cycles before being left under N$_2$. Column is heat traced and flask is immersed into bath at 160° C. Set point of bath is increased to 175° C. with a total of 2 hours from 160 to 175° C. under positive N$_2$. Over a period of about 2.6 hours, pressure is lowered stepwise and held at 10 Torr. Apparatus is placed under full vacuum of about 0.4 Torr for 2 hours at bath temperature of 175° C. Apparatus is kept under full vacuum of about 0.3 Torr for a total of about 7 hours and the bath temperature is increased and held at 190° C. Product Inherent Viscosity=0.395 dL/g (0.5 g/dL, 30.0° C., chloroform/methanol (1/1, w/w)). DSC, Tensile, and Dynamic Mechanical characterizations are found in FIGS. 1-4.

Example 7

Polymerization Using an In-Situ Process with Diester Diamide A4A Monomer

Into a 2-neck 250 mL round bottom flask are loaded titanium (IV) butoxide (0.341 g, 1.0 mmol), 1,4-diaminobutane (8.824 g, 0.1001 mol), and dimethyl adipate (87.16 g, 0.5004 mol). First stage reaction apparatus is completed with N$_2$ inlet adaptor, stir-shaft & blade, bearing, Claisen adaptor, Dean-Stark trap, condenser, outlet adaptor, and temperature controlled heating mantle. Reaction profile for first stage is 10 minutes to/at 50° C., 15 minutes to/at 60° C., 30 minutes to/at 75° C., 60 minutes to/at 100° C., 135 minutes to/at 125° C., and 150 minutes to/at 150° C. Reaction mixture is cooled with all but stir-shaft and blade removed from the apparatus and a Vigoreaux column/distillation head with bearing is inserted into the flask along with the 2$^{nd}$ neck stoppered. 1,4-Butanediol (71 mL, 0.80 mol) and titanium (IV) butoxide (0.15 mL, 0.44 mmol) are injected into the flask. Apparatus is degassed with three vacuum/N$_2$ cycles before being left under N$_2$. Column is heat traced and flask is immersed into bath at 160° C. Set point of bath is increased to 175° C. with a total of 2 hours to/at 175° C. under positive N$_2$. Over a period of about 2.5 hours, pressure is lowered stepwise and held at 10 Torr. Apparatus is placed under full vacuum of about 0.4 Torr for 2 hours at bath temperature of 175° C. Apparatus is kept under full vacuum of about 0.4 Torr for a total of about 5 hours with bath temperature increased and held at 190° C. Product Inherent Viscosity=0.316 dL/g (0.5 g/dL, 30.0° C., chloroform/methanol (1/1, w/w)). DSC, Tensile, and Dynamic Mechanical characterizations are found in FIGS. 1-4.

Example 8

Polymerization Using Crude Diester Diamide A4A Monomer with Mixture of Diols

Into a 250 mL round bottom flask is loaded tin octanoate (0.159 g, 0.392 mmol), crude dimethyl 7,12-diaza-6,13-dioxo-1,18-octadecanedioate (A4A, 24.00 g, 64.44 mmol), dimethyl adipate (33.67 g, 0.1933 mol), UNOXOL™ (18.59 g, 0.1288 mol, a mixture of 1,3- and 1,4-cyclohexanedimethanol) and 1,4-butanediol (34.85 g. 0.3867 mol). Into the flask is inserted a stir-shaft and blade, bearing, along with a Vigoreaux column/distillation head. Apparatus is degassed with three vacuum/$N_2$ cycles before being left under $N_2$. Column is heat traced and flask is immersed into bath at 160° C. Set point of bath is increased to 175° C. with a total of 2 hours from 160 to 175° C. under positive $N_2$. Over a period of about 2.3 hours, pressure is lowered stepwise and held at 10 Torr. Apparatus is placed under full vacuum of about 0.4 Torr for 2 hours at bath temperature of 175° C. Apparatus is kept under full vacuum of about 0.3 Torr for about 2 hours with bath temperature is increased and held at 190° C. Apparatus is kept under full vacuum of about 0.3 Torr for about 2 hours with bath temperature is increased and held at 210° C. Product Inherent Viscosity=0.293 dL/g (0.5 g/dL, 30.0° C., chloroform/methanol (1/1, w/w)). By $^1$H-NMR, about 29 mol % of repeat units contain A4A amide with product having a $M_n$ of 13,400. By tensile testing, strain @ break=320%; modulus, tan 0.15%=119 megaPascals (MPa); tensile stress @ max load=6.2 MPa; integrated stress-strain=6.03 inch-pound force (in-lbf).

Example 9

Polymerization Using Crude Diester Diamide A4A Monomer with Mixture of Diol and Polyol Into a 250 mL round bottom flask is loaded titanium (IV) butoxide (0.078 g, 0.23 mmol), crude dimethyl 7,12-diaza-6,13-dioxo-1,18-octadecanedioate (A4A, 13.97 g, 37.50 mmol), dimethyl adipate (19.60 g, 0.1125 mol), polytetramethylene ether glycol, $M_n$ 983 (36.86 g, 37.50 mmol, TERATHANE™ 1000) and 1,4-butanediol (23.66 g. 0.2625 mol). Into the flask is inserted a stir-shaft and blade, bearing, along with a Vigoreaux column/distillation head. Apparatus is degassed with three vacuum/$N_2$ cycles before being left under $N_2$. Column is heat traced and flask is immersed into bath at 160° C. Set point of bath is increased to 175° C. with a total of 2 hours from 160 to 175° C. under positive $N_2$. Over a period of about 2.5 hours, pressure is lowered stepwise and held at 10 Torr. Apparatus is placed under full vacuum of about 0.3 Torr for 2 hours at bath temperature of 175° C. Apparatus is kept under full vacuum of about 0.4 Torr for about 2 hours with bath temperature is increased and held at 190° C. Apparatus is kept under full vacuum of about 0.4 Torr for about 2 hours with bath temperature is increased and held at 210° C. Product Inherent Viscosity=0.485 dL/g (0.5 g/dL, 30.0° C., chloroform/methanol (1/1, w/w)). By $^1$H-NMR, about 34 mol % of repeat units contain A4A amide. By tensile testing, strain @ break=317%; modulus, tan 0.15%=4.4 MPa; tensile stress @ max load=3.1 MPa; integrated stress-strain=3.17 in-lbf.

Example 10

Polymerization Using Crude Diester Diamide A4A Monomer with Mixture of Diol and Polyol Into a 250 mL round bottom flask is loaded titanium (IV) butoxide (0.084 g, 0.25 mmol), crude dimethyl 7,12-diaza-6,13-dioxo-1,18-octadecanedioate (A4A, 29.77 g, 79.93 mmol), dimethyl adipate (13.92 g, 79.91 mmol), poly(ethylene glycol)-block-poly(propylene glycol)-block-poly(ethylene glycol), about 10 wt % PEG, $M_n$ 1100 (22.65 g, 20.59 mmol) and 1,4-butanediol (26.95 g. 0.2990 mol). Into the flask is inserted a stir-shaft and blade, bearing, along with a Vigoreaux column/distillation head. Apparatus is degassed with three vacuum/$N_2$ cycles before being left under $N_2$. Column is heat traced and flask is immersed into bath at 160° C. Set point of bath is increased to 175° C. with a total of 2 hours from 160 to 175° C. under positive $N_2$. Over a period of about 2.5 hours, pressure is lowered stepwise and held at 10 Torr. Apparatus is placed under full vacuum of about 0.4 Torr for 2 hours at bath temperature of 175° C. Apparatus is kept under full vacuum of about 0.4 Torr for about 2 hours with bath temperature is increased and held at 190° C. Apparatus is kept under full vacuum of about 0.4 Torr for about 2 hours with bath temperature is increased and held at 210° C. Product Inherent Viscosity=0.386 dL/g (0.5 g/dL, 30.0° C., chloroform/methanol (1/1, w/w)). By $^1$H-NMR, about 62 mol % of repeat units contain A4A amide. By tensile testing, strain @ break=558%; modulus, tan 0.15%=68 MPa; tensile stress @ max load=12.2 MPa; integrated stress-strain=14.35 in-lbf.

Example 11

Property Measurements of Various Polyesteramides

Table 2 below provides physical properties of various polyesteramide polymers prepared from decreased perfection diamide diester monomers according to the invention, compared with polymers prepared from purified diamide diester monomers. The following abbreviations are used in Table 2:

- Hard segment=monomer of formula (A) utilized in preparing copolymer where A represents R'''=four methylenes, and the number 2, 4, or 6 represents the number of methylene groups between the amine groups in formula (B) structures.
- Mole %=amount of monomer of formula (A) incorporated into copolymer assuming for measurement purposes that n=1 using proton NMR
- PBA=polybutylene adipade (product of dimethyl adipate and 1,4-butanediol)
- C=polymerization using crude monomer, such as described in Example 6
- P=polymerization using purified monomer, such as described in Example 5
- I=polymerization using in situ procedure, such as described in Example 7
- IV=inherent viscosity
- $M_n$=number average molecular weight, in thousands of g/mol (K) from proton NMR; obtained from integrated ratio of C(O)—$CH_2$/$CH_2$OH and multiplying by the average molecular weight of a polymer repeat unit
- Tm=melting point maxima in DSC at 10° C./min heating rate upon rescan ΔHf=heat of fusion; integration of melting peak at 10° C./min upon rescan in DSC Tcr=crystallization temperature maxima in DSC at 10° C./min cooling rate from melt ΔHcr=heat of crystallization; integration of crystallization peak at 10° C./min cooling rate from melt The data reveal that polymer products with decreased perfection do not completely melt until some temperature greater than when a purified monomer is utilized as illustrated in the DSC in FIG. 1 and that the materials with decreased perfection also crystallize at a higher temperature than when a purified monomer is utilized as illustrated in FIG. 2. Retaining crystallinity to a higher temperature allows a material to be used at higher temperatures due to improved dimensional stability which is illustrated in FIG. 4 where the products from a crude process or in-situ process have a higher modulus at higher temperatures above about 70° C. Crystallizing at a higher temperature in materials with decreased perfection can offer the advantage of fabricated articles that solidify at a higher temperature which can offer productivity.

Example 12

Homopolyesteramide (x=0) from Crude A2A and 1,4-Butanediol. In a nitrogen atmosphere, titanium (IV) butoxide (0.038 g, 0.11 mmol), crude A2A (23.24 g, 67.49 mmol), and 1,4-butanediol (12.16 g, 0.1350 mol) are loaded into a 100 mL round bottom flask. Into the flask is inserted a stir-shaft and blade, take-off adaptor, and stir-bearing. Apparatus is degassed with three vacuum/nitrogen cycles before being left under nitrogen. Adaptor is heat-traced and flask is immersed into 160° C. bath with bath set point raised to 175° C. with a total of 2 hours from 160° C. to 175° C. Over a period of about 2 hours, pressure is lowered stepwise and held at 10 Torr. Apparatus is kept under full vacuum (about 0.7 Torr) for a total of about 3.5 hours and the bath temperature is increased and held at 190° C. Product inherent viscosity=0.397 dL/g (0.5 g/dL, 30.0° C., m-cresol). By DSC, $T_g$=−67° C., $T_m$=150, 163° C. (42 J/g), $T_{cr}$=130° C. (37 J/g).

Example 13

Homopolyesteramide (x=0) from Crude A4A and 1,4-Butanediol. In a nitrogen atmosphere, titanium (IV) butoxide (0.035 g, 0.10 mmol), crude A4A (23.37 g, 62.74 mmol), and 1,4-butanediol (11.31 g, 0.1255 mol) are loaded into a 100 mL round bottom flask. Into the flask is inserted a stir-shaft and blade, take-off adaptor, and stir-bearing. Apparatus is degassed with three vacuum/nitrogen cycles before being left under nitrogen. Adaptor is heat-traced and flask is immersed into 160° C. bath with bath set point raised to 175° C. with a total of 2 hours from 160° C. to 175° C. Over a period of about 2 hours, pressure is lowered stepwise and held at 10 Torr. Apparatus is kept under full vacuum (about 0.35 Torr) for a total of about 2 hours and the bath temperature is increased and held at 190° C. Product inherent viscosity=0.421 dL/g (0.5 g/dL, 30.0° C., m-cresol). By DSC, $T_g$=−51° C., $T_m$=143, 157° C. (47 J/g), $T_{cr}$=111° C. (39 J/g).

Example 14

Homopolyesteramide (x=0) from Crude A4A and 1,3-Propanediol. In a nitrogen atmosphere, titanium (IV) butoxide (0.036 g, 0.10 mmol), crude A4A (24.22 g, 65.02 mmol), and 1,3-propanediol (9.90 g, 0.13 mol) are loaded into a 100 mL round bottom flask. Into the flask is inserted a stir-shaft and blade, take-off adaptor, and stir-bearing. Apparatus is degassed with three vacuum/nitrogen cycles before being left under nitrogen. Adaptor is heat-traced and flask is immersed into 160° C. bath with bath set point raised to 175° C. with a total of 2 hours from 160° C. to 175° C. Over a period of about 2 hours, pressure is lowered stepwise and held at 10 Torr. Apparatus is kept under full vacuum (about 0.25 Torr) for a total of about 3 hours and the bath temperature is increased stepwise and finally held at 210° C. Product inherent viscosity=0.417 dL/g (0.5 g/dL, 30.0° C., m-cresol). By DSC, $T_g$=−64° C., $T_m$=153° C. (78 J/g), $T_{cr}$=128° C. (61 J/g).

Example 15

Homopolyesteramide (x=0) from Crude A6A and 1,4-Butanediol. In a nitrogen atmosphere, titanium (IV) butoxide (0.033 g, 0.096 mmol), crude A6A (23.47 g, 58.61 mmol), and 1,4-butanediol (10.56 g, 0.1172 mol) are loaded into a 100 mL round bottom flask. Into the flask is inserted a stir-shaft and blade, take-off adaptor, and stir-bearing. Apparatus is degassed with three vacuum/nitrogen cycles before being left under nitrogen. Adaptor is heat-traced and flask is immersed into 160° C. bath with bath set point raised to 175° C. with a total of 2 hours from 160° C. to 175° C. Over a period of about 2 hours, pressure is lowered stepwise and held at 10 Torr. Apparatus is kept under full vacuum (about 0.3 Torr) for a total of about 5.5 hours and the bath temperature is increased stepwise and held at 210° C. Product inherent viscosity=0.170 dL/g (0.5 g/dL, 30.0° C., m-cresol). By DSC, $T_g$=−65° C., $T_m$=131, 142° C. (60 J/g), $T_{cr}$=114° C. (50 J/g).

Example 16

Homopolyesteramide (x=0) from Crude A4A and 1,3-Propanediol. In a nitrogen atmosphere, titanium (IV) butoxide (0.034 g, 0.10 mmol), crude A4A (24.27 g, 60.60 mmol), and 1,3-propanediol (9.22 g, 0.121 mol) are loaded into a 100 mL round bottom flask. Into the flask is inserted a stir-shaft and blade, take-off adaptor, and stir-bearing. Apparatus is degassed with three vacuum/nitrogen cycles before being left under nitrogen. Adaptor is heat-traced and flask is immersed into 160° C. bath with bath set point raised to 175° C. with a total of 2 hours from 160° C. to 175° C. Over a period of about 2 hours, pressure is lowered stepwise and held at 10 Torr. Apparatus is kept under full vacuum (about 0.3 Torr) for a total of about 4 hours and the bath temperature is increased stepwise and finally held at 210° C. Product inherent viscosity=0.756 dL/g (0.5 g/dL, 30.0° C., m-cresol). By DSC, $T_g$=−62° C., $T_m$=149° C. (69 J/g), $T_{cr}$=128° C. (57 J/g).

The examples illustrate simpler and more economical processes for preparing polyesteramides and new polyesteramides that exhibit improved physical properties.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

TABLE 2

| Hard Segment | Mole % | Soft Segment | Process | IV (dL/g) | $M_n$ (K) | Tg (°C.) | Tm (°C.) | ΔHf (J/g) | Tcr (°C.) | ΔHcr (J/g) | Strain at Break (%) | Integrated Stress-Strain (in-lbf) | Modulus Tan 0.15% (MPa) | Tensile Stress @ Max Load (MPa) | 24 Hr H2O Wt % |
|---|---|---|---|---|---|---|---|---|---|---|---|---|---|---|---|
| A2A | 25.7 | PBA | C | 0.42 | 11.6 |  | 56, 112 | 27.3 | 32 | 21.5 | 1230 | 41.21 | 115 | 16.7 | 3.7 |
| A2A | 26.2 | PBA | C | 0.21 | 7 |  | 57, 105 | 19.3 | 41 | 18.7 | 71 | 1.2 | 118 | 6.1 |  |
| A2A | 25.6 | PBA | P | 0.32 | 11.1 |  | 60, 106 | 23.6 | 40 | 33.7 | 1292 | 39.44 | 149 | 14.9 |  |
| A2A | 54 | PBA | C | 0.38 | 9.4 | −34 | 65, 132 | 41.6 | 97, 59 | 53.9 | 736 | 33.23 | 242 | 21.4 |  |
| A4A | 11.8 | PBA | I | 0.22 | 7.5 |  | 58 | 31.2 | 26, 5 | 38.3 | 323 | 5.99 | 109 | 7 |  |
| A4A | 13.6 | PBA | P | 0.38 | 8.6 |  | 62, 82 | 16.9 | 39, −7 | 21.2 | 1081 | 32.44 | 22 | 13.1 |  |
| A4A | 14.3 | PBA | C | 0.35 | 9.2 |  | 56 | 27.5 | 34, −5 | 12.7 | 985 | 32.81 | 9 | 13.5 | 0.7 |
| A4A | 24.7 | PBA | I | 0.33 | 10 | −48 | 60, 142 | 15.5 | 110, 35 | 14.4 | 513 | 17.8 | 105 | 11.9 |  |
| A4A | 27.2 | PBA | P | 0.41 | 11.4 | −47 | 78, 114 |  | 57 | 25.8 | 851 | 28.64 | 105 | 14.5 |  |
| A4A | 28.4 | PBA | C | 0.32 | 7.3 | −46 | 64, 127 | 25.1 |  |  | 605 | 21.13 | 88 | 11.8 |  |
| A4A | 37.8 | PBA | I | 0.33 | 17.2 | −32 | 57, 158 | 57.1 | 130, 37 | 22.2 | 336 | 11.82 | 144 | 11.6 |  |
| A4A | 48.8 | PBA | P | 0.38 | 7.8 | −33 | 75, 139 | 49.6 | 105, 60 | 41.3 | 626 | 41.52 | 181 | 23.7 |  |
| A4A | 52.1 | PBA | C | 0.38 | 8.4 | −35 | 72, 135 | 37.7 | 110, 62 | 26.8 | 519 | 31.45 | 203 | 19.7 | 4.3 |
| A6A | 25.5 | PBA | I | 0.33 | 11.7 |  | 63, 140 | 31.7 | 117, 45 | 18.1 | 617 | 18.46 | 120 | 11.8 |  |
| A6A | 26.7 | PBA | P | 0.34 | 10.8 |  | 81, 102, 113 |  | 62 | 26.8 | 758 | 21.5 | 84 | 10.7 |  |
| A6A | 29.7 | PBA | C | 0.38 | 13.4 | −45 | 75, 125 | 40.2 | 97, 59 | 29.3 | 540 | 15.87 | 177 | 10.2 |  |
| A6A | 57.6 | PBA | C | 0.44 | 13.4 | −31 | 82, 125 | 34.2 | 98, 68 | 20.2 | 101 | 4.68 | 262 | 16.4 |  |
| A6A |  | PBA |  |  |  |  |  |  |  |  | 93.1 | 3.05 | 85.49 | 15.48 |  |

What is claimed is:

1. A copolyesteramide polymer of formula (I):

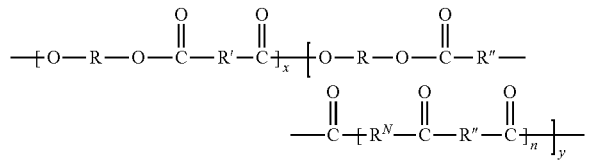

formula (I)

wherein
R at each occurrence is independently an aliphatic group, a heteroaliphatic group, cycloalkylene, -alkylene-cycloalkyl-, -alkylene-cycloalkyl-alkylene-, -heteroalkylene-cycloalkyl-, -cycloalkyl-heteroalkylene-, -heteroalkylene-cycloalkyl-heteroalkylene-, or a polyalkylene oxide;

R' and R" at each occurrence are independently a bond or an aliphatic group, cycloalkylene, -alkylene-cycloalkyl-, or -alkylene-cycloalkyl-alkylene-;

$R^N$ is —N($R^2$)—Ra—N($R^2$)— where $R^2$ is independently H or $C_1$-$C_6$ alkyl, Ra independently is a heterocycloalkylene group, an aliphatic group, cycloalkylene, -alkylene-cycloalkyl-, -cycloalkyl-alkylene-, or -alkylene-cycloalkyl-alkylene, wherein the heterocycloalkylene group contains two nitrogen atoms connecting the heterocycloalkylene to the adjacent carbonyl groups;

x is 1 or higher that represents the number of ester units and y is an integer of 2 or higher that represents the number of amide units in the copolymer;

each n independently represents an integer of 1 or greater; and wherein the copolymer of formula (I) comprises two or more said amide units:
where n is 1 in at least half the number of said amide units; and
n is greater than 1 in at least one of said amide units, with the copolymer having an $H_w$ of greater than 1.05 and less than 1.9, wherein $H_w$ is a weighted average value of n.

2. A polymer according to claim 1 wherein R at each occurrence is independently $C_2$-$C_{12}$ alkylene.

3. A polymer according to claim 1 wherein R is $C_2$-$C_{12}$ heteroalkylene.

4. A polymer according to claim 1 wherein R is a polyalkylene oxide.

5. A polymer according to claim 1 wherein R is polytetramethylene ether, polypropylene oxide, or polyethylene oxide.

6. A polymer according to claim 1 wherein R' and R" at each occurrence are $C_2$-$C_{10}$ alkylene.

7. A polymer according to claim 1 wherein $R^N$ is —N(H)—Ra—N(H)— and R' a is $C_2$-$C_{12}$ alkylene.

8. A polymer according to claim 1 wherein $R^N$ is piperazin-1,4-diyl.

9. A polymer according to claim 1, wherein there are two or more occurrences of R' or R" and in at least two of the two or more occurrences, the R' or R" are different.

10. A process for making a copolyesteramide polymer according to claim 1, the process comprising:
(a) providing a monomer product comprising a mixture of two or more monomers of formula (A):

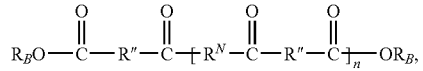

(formula (A))

wherein $R_B$ is independently at each occurrence H or $C_1$-$C_6$ alkyl,
and wherein each n independently is an integer of 1 or higher and n is 1 in at least half of the monomers and n is greater than 1 in at least one of the monomers, with the monomer product having an $H_w$ of greater than 1.05 and less than 1.9, wherein $H_w$ is a weighted average value of n;

(b) copolymerizing the monomers of formula (A) with a diacid or diester of formula (C):

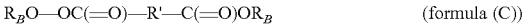

(formula (C))

and one or more diols of formula (D):

(formula (D)), to provide the polymer of formula (I).

11. A process according to claim 10 wherein the monomer product of formula (A) is prepared by reacting a diamine of formula (B):

     (formula (B))

with a diacid or diester of formula (C):

     (formula (C)).

12. A process according to claim 10 wherein the one or more diols is a mixture of diols.

13. A process according to claim 12 wherein the mixture of diols is 1,4-butanediol and an isomer mixture of 1,3- and 1,4-cyclohexanedimethanol.

14. A process according to claim 12 wherein the mixture of diols is 1,4-butanediol and polytetramethylene ether glycol.

15. A process according to claim 10 wherein the polymer of formula (I) is prepared by in-situ synthesis.

16. A process according to claim 10 wherein the polymer of formula (I) is prepared by a one-pot process.

17. A copolymer prepared by the process of claim 10.

18. Polymers according to claim 1 having the formula:

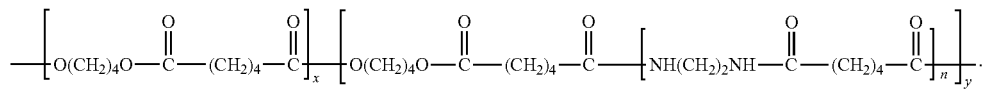

* * * * *